Patented Jan. 23, 1940

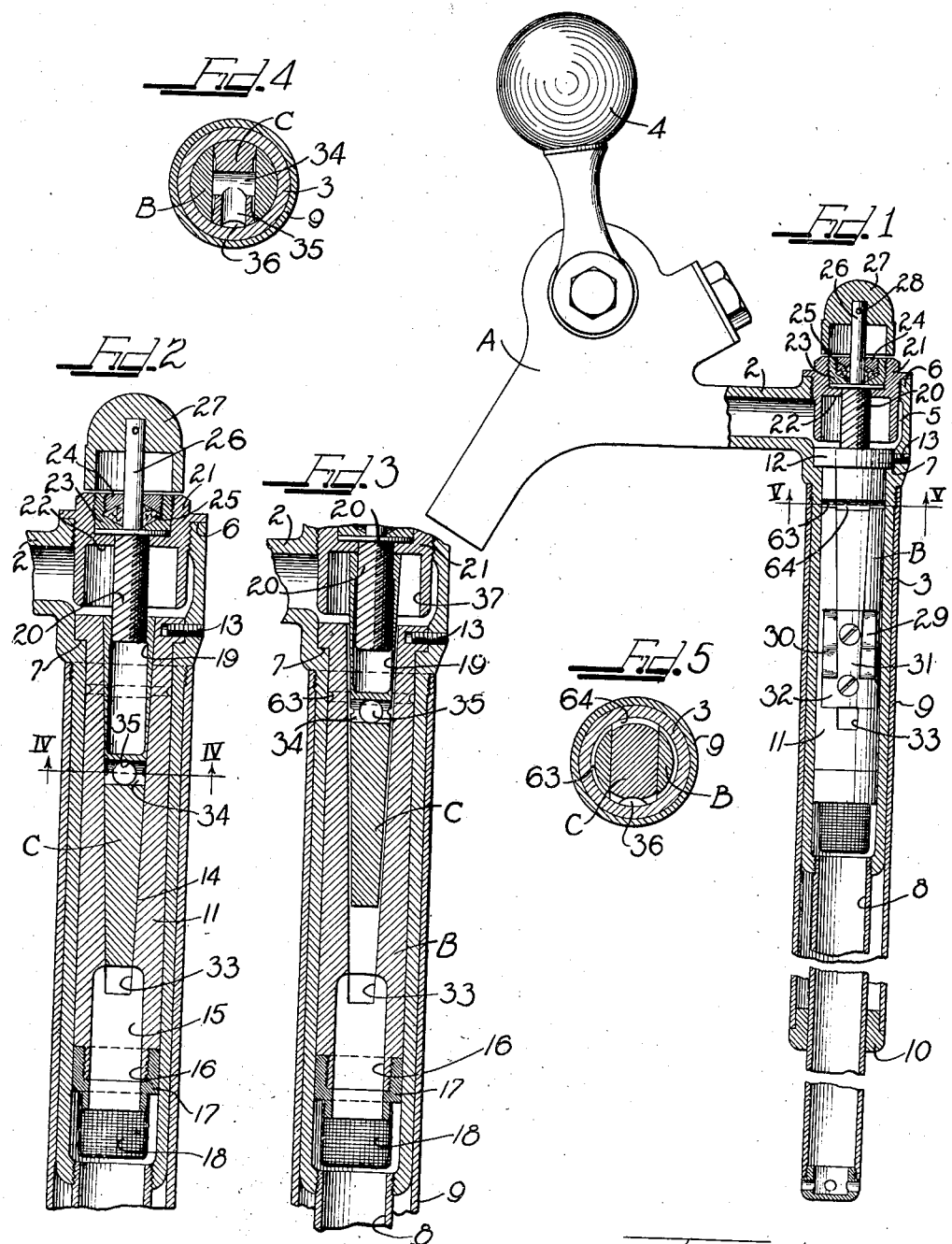

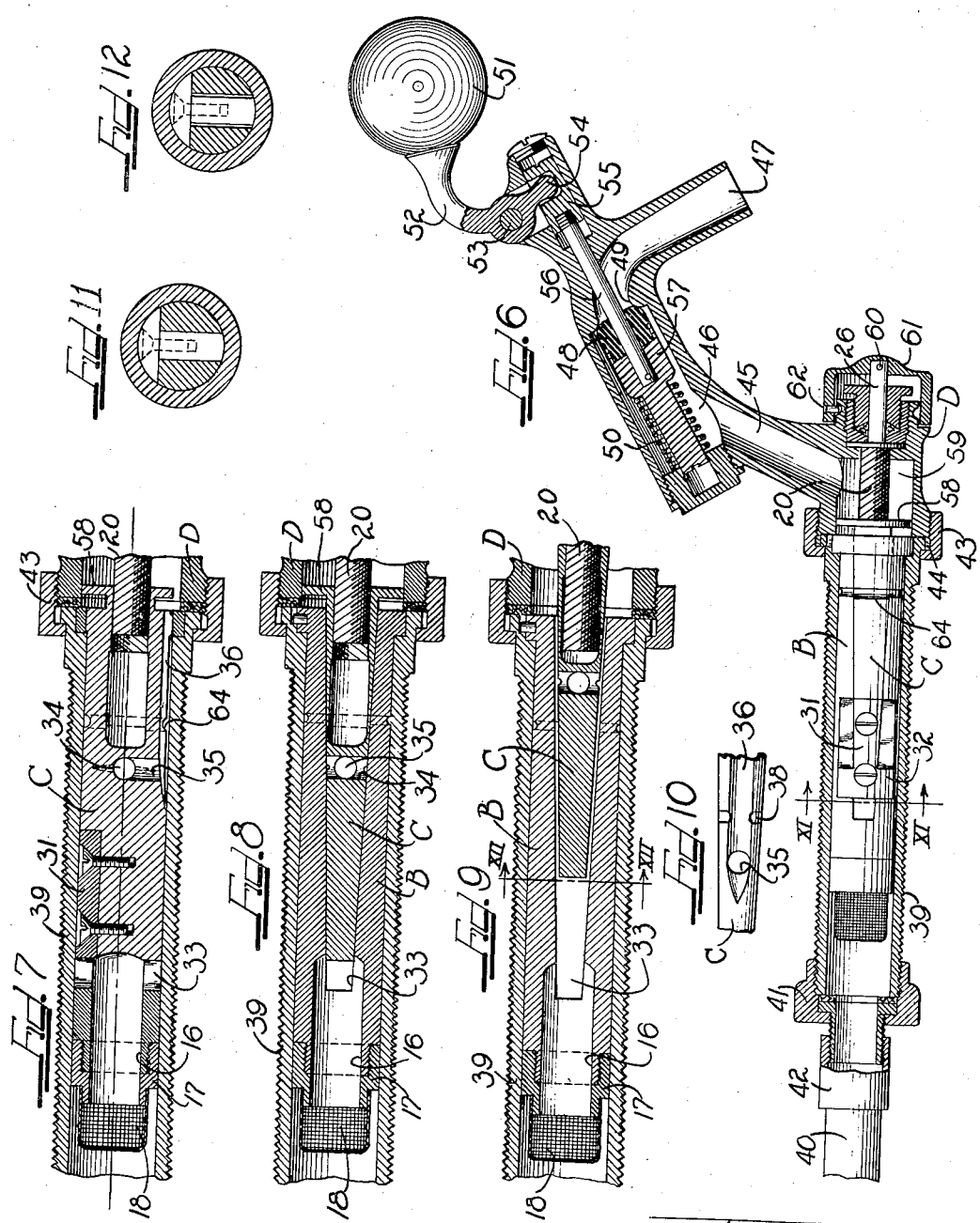

2,187,793

UNITED STATES PATENT OFFICE 2,187,793

BEER DISPENSING DEVICE

Frank E. Rice, Detroit, Mich., assignor to American Tap-Bush Company, Detroit, Mich., a corporation of Delaware Application March 4, 1938, Serial No. 193,820

3 Claims. (Cl. 138—46)

The present invention relates to a beer dispensing device and has for an object a device whereby beer may be drawn from a barrel in a manner to constitute a flow regulator to prevent excessive foam formation as the beer is discharged into any type of receptacle.

Another object of the present invention is to provide a flow regulator for beer tapping means which may be readily adjusted to accommodate a beer faucet for use with barreled beer where the internal pressure in the barrel may vary considerably over a wide range, without requiring different types of faucets with different barrel pressures.

A further object of the present invention is to provide a beer tapping means with a flow regulator so adjustable as to accommodate a beer faucet to different pressure conditions in barreled beer so that the faucet will operate without leakage and without the creation of an excessive amount of foam.

A still further object of the present invention is to provide a flow regulator for beer tapping means whereby beer may be discharged at a faucet or spigot at substantially uniform pressure, regardless of the amount of pressure supplied to the barrel or keg in which the beer is packaged.

A still further object of the present invention is to provide a flow regulator for beer dispensing means which is capable of adjustment to accommodate it to varying pressures, which adjustment may be quickly and easily made.

Generally speaking, the flow regulator of the present invention contemplates a core having an elongated V-shaped slot or notch in it with a complementally shaped wedge member working in the slot, which wedge is endwise adjustable to afford passageway for beer between the surfaces of the wedge and the slot, for equalizing pressure of beer in order that it may be dispensed through a spigot under low pressure and without creation of an excessive amount of foam in a glass or other receptacle.

The invention also contemplates the provision of a flow regulator means interposed between the intake to the draught tube and the dispensing faucet for providing a restricted passageway to the flow of beer whereby the flow is so throttled that the beer may be dispensed without excessive foam when the faucet is wide open regardless of the nature of the beer, and regardless of the amount of pressure present in the barrel. The said flow regulator is easily adjustable to accommodate it to any pressure conditions found in different barrels.

The invention also contemplates the provision of a flow regulator for beer dispensing means which is independent of the faucet valve for throttling the flow of beer from a barrel to the faucet.

The accompanying drawings illustrate structures arranged to carry out the present invention which are shown in two forms, one for application to a beer faucet having a delivery tube disposed in horizontal position, and another faucet having the delivery tube disposed in vertical position. It is to be understood at the outset that the present invention is capable of application to beer tapping means irrespective of the position of the draught tube and of the faucet structure.

The above, other and further objects of the present invention will be apparent from the following description and accompanying drawings.

Figure 1 is a view partially in elevation and partially in central section, through a beer tapping means arranged for disposition of the draught tube in vertical position, and equipped with the flow regulator of the present invention. The parts shown in this figure appear as when the passageway through the core member is closed.

Figure 2 is an enlarged fragmental vertical sectional view through the flow regulator of Figure 1, with the passageway through the core closed.

Figure 3 is a view similar to Figure 2 showing the wedge member of the flow regulator shifted to afford passageway through the core and showing the relationship of the parts when the passageway is partially open.

Figure 4 is a transverse sectional view taken in the plane indicated by line IV—IV of Figure 2.

Figure 5 is a transverse sectional view taken in the plane indicated by line V—V of Figure 1.

Figure 6 is a view, partially in elevation and partially in central section of a beer tapping means and faucet structure in which the parts are horizontally disposed, and showing the flow regulator of the present invention closed against passageway through the regulator, and showing the faucet closed to discharge.

Figure 7 is a fragmental central sectional view through the flow regulator of Figure 6 with the passageway through the core closed.

Figure 8 is a fragmental axial sectional view through the regulator of Fig. 6, taken at ninety degreees to Figure 7.

Figure 9 is a sectional view similar to Figure 8 showing the core open to fluid passageway through it.

Figure 10 is a fragmental elevational view of a portion of the surface of the wedge member of the regulator showing in plan a surface groove formed in the wedge for fluid passageway.

Figure 11 is a transverse sectional view taken on line XI—XI of Figure 6;

Figure 12 is a transverse sectional view taken in the plane of line XII—XII of Figure 9.

The drawings will now be explained.

Figure 1 shows a faucet A having the usual discharge faucet A with a spigot 1, a neck 2 which in the present instance is made integral with a shank portion 3 formed at right-angles to the neck. The faucet is provided with the usual ball handle 4 for actuating a valve, not shown, interiorly of the faucet structure as is common practice. At the junction of the neck 2 and the shank 3, the casting formed to provide a chamber portion 5 having its upper end 6 open. Within the shank 3 and adjacent the neck 2, the casting is formed with an annular shoulder 7.

Connected to the lower end of the shank 3 is a draught tube 8 of usual construction and which is threaded into the lower end of the shank. Surrounding the shank 3 and a portion of the draught tube 8 is a casing 9 which is threaded to the casting adjacent the neck 2.

The lower end of the casing 9 is sealed with respect to the draught tube 8 by means of a doughnut shaped plug 10.

For regulating the flow of beer through the draught tube 8 and through the faucet A, a regulator is interposed in the shank 3. The regulator, designated generally as B, comprises a core 11 of generally cylindrical shape to fit within the cylindrical interior of the shank 3 in tight relationship. The upper end of the core is provided with an annular ring or projection 12 which seats against the shoulder 7 to limit the position of the regulator B in the shank. The shank and the ring 12 are provided with cooperating means to prevent relative rotative movement between the regulator and the shank. The means illustrated in the present instance comprises a set screw 13 threaded in a suitable opening in the casting and entered in an aperture in the ring 12, as may be observed in Figures 1, 2 and 3.

The core 11 is fashioned with an elongated V-shaped notch or slot 14 which extends from one end of the core, herein illustrated as the upper end, toward the other end, stopping short of said other end. The walls of the slot are flat and converge from the upper end of the core toward the other end, as illustrated. The other end of the core 11 is hollow as at 15 with its extremity reduced in diameter as at 16, and is exteriorly threaded to receive a threaded cap 17 carrying a sieve 18. Working within the slot 14 of the core is a wedge C which is complementally shaped with respect to the slot 14 and in length substantially that of the length of the slot. The side surfaces of the wedge are flat, arranged to make surface engagement with the walls of the notch or slot in the core, as may be observed in the drawings. In this form of the invention, the upper or wider end of the wedge C is counterbored and threaded as at 19 to receive a spindle 20, the threaded portion of the wedge and the spindle being formed with quick acting threads so as to readily adjust the wedge member by slight rotative movement of the spindle.

A skirted nut 21 is threaded into the open end 6 of the shank and is provided with a partition 22 threaded to receive the threaded portion of the spindle 20. About the partition 22, one member 23 of a gland is threaded into the nut while a second member 24 is threaded into the interior of the upper portion 23 to compress a packing 25 about the extension 26 of the spindle. A cap 27 is fastened to the extension 26 by means of a pin 28 or other suitable fastening means. The cap 27 may be rotated in either direction to thus axially or longitudinally adjust the wedge C in the core B. The exterior surfaces of the wedge C are circular to conform to the cylindrical interior of the shank 3 and when closed to register with the cylindrical surfaces of the core. For guiding the wedge C in its reciprocable movements, and also for limiting its extent of axial movement with respect to the core, a portion of the margins of the slots in the core are cut away as at 29 and 30 and a T-shaped piece 31 is fastened to the wedge with the head 32 of the T-shaped piece resting against the bottom of the cutout portions 29 and 30, as may be observed in Figure 1. The core B is apertured at 33 below the lower end of the wedge which aperture communicates with the hollow interior 15 of the core.

Near the upper end of the core and the wedge, the core is provided with an annular groove 63 while the cylindrical surfaces of the wedge C are formed with registering grooves 64. That is to say the groove 64 of the wedge register with the grooves 63 of the core when the wedge is in tight engagement with the flat surfaces of the slot or is slightly spaced from said surfaces.

The wedge C is provided with a cross or transverse opening 34 opening through the opposite side surfaces of the wedge, and is also formed with an outlet 35 from the opening 34 through one of the cylindrical surfaces of the wedge, as illustrated in Figure 4. The said surface of the wedge is longitudinally grooved from adjacent said opening 35 to the upper or wider end of the wedge, as at 36, in the manner clearly shown in Fig. 7 and Fig. 10.

In order to dispense beer from barrels or kegs, it is necessary to create sufficient pressure in the barrels or kegs to force the beer out through the draught tubes and faucets. For creating pressure in such barrels, air or gas is utilized, the amount of pressure supplied varying with the individual bartender. At the present time, the practice in the amount of pressure used in beer barrels varies in different parts of the country from low pressure such as ten pounds up to high pressure sometimes as high as fifty to sixty pounds. It may be very readily observed that a faucet manufactured to dispense beer at low pressures, say ten to twenty pounds, would leak when utilized with a higher pressure and cause excessive foaming. In like manner, a faucet designed to accommodate itself to high pressures only might be unsatisfactory when lower pressures were used in the barrel to which said faucet might be connected.

By the provision of the flow regulator of the present invention, any barrel pressure may be adapted for use with any type of faucet to dispense beer through the faucet in such manner as to make the beer clear and without excessive foam.

When the flow regulator of the present invention is utilized in a beer dispensing means employing low pressure, the cap nut 27 is manipulated so that the wedge C may be adjusted relatively to the slot in the core so as to enable flow of beer through the spigot 1 of the faucet without excessive foam and with the desired degree of clarity. Inasmuch as the wedge may be very readily manipulated, its relative position may be quickly determined to produce a beer discharge of proper sort and kind through the spigot 1 of the faucet.

With the wedge in wide open position, beer flows through the core between the flat surfaces of the slot and the wedge, issuing into the neck 2 of the faucet of the wedge, and also some beer passes through the opening 34 and 35 and through the groove 36, to the neck.

When the flow regulator of the present invention is adapted for use with higher pressure in the beer barrel, the wedge is moved inwardly to reduce the cross-sectional area of the passageway through the core thus reducing excessive foam at the spigot and adapting the faucet structure to high pressure conditions in the barrel. Where excessively high pressure is employed in the barrel, such as from forty to fifty or sixty pounds, the amount of passageway between the side surfaces of the slot and the wedge will be very slight. Under such conditions, sufficient skin friction is created between the beer and the surfaces of the passageway as to cause the beer to flow, in the main, through the opening 34, outlet 35 and along the groove 36 into the chamber adjacent the neck 2 of the faucet structure. Because of the presence of such skin friction, this path of flow just described is the flow of least resistance.

By use of the flow regulator just described, the beer is delivered into the neck, in substantially a single stream from the flow regulator, thus reducing or eliminating sizzling of the beer as it issues from the regulator.

Any beer that should perchance enter between the surface of the core and the interior surface of the shank 3 travels by the grooves 63 into the passageway between the walls of the slot and the wedge member and enters the neck 2 of the faucet structure along its proper path.

The skirt 37 of the nut 21 is so disposed with reference to the exit end of the passageway through the core, as to cause the beer issuing from the core to enter within the skirt thereby reducing pressure of the beer prior to its entry into the neck 2 of the faucet fastening. Furthermore, the beer issuing from the groove 36 likewise enters within the skirt 37 and there mingles with the beer discharged from the mentioned passageway.

In the form of the invention illustrated in Figures 6 to 12 inclusive, a shank 39 is exteriorly threaded for entry through a vertical partition where it is secured in place by the usual ring nuts, not shown, threaded on the exterior of the shank.

At one end, the left end as illustrated, a connection 40 from a barrel, is secured to the shank by means of a nut 41 and coupling 42 in the usual manner.

Connected to the other end of the shank is a faucet casting D which is secured to the shank by means of a ring nut 43 threaded to the casting and engaging a shoulder 44 formed as an integral part of the neck.

The faucet casting has the usual neck 45 through which beer passes to a chamber 46 communicating with a spigot 47. A normally closed valve 48 rests against its seat 49 to close the passageway through the spigot. The valve is normally maintained in closed position by means of a spring 50, and is opened by action of the usual ball handle 51 mounted on a lever 52 pivoted at 53 and having an end 54 engaging a slide block 55 connected to one end of a spindle 56 with its other end attached to the carrier 57 for the valve 48.

The flow regulator B is inserted in the shank 39 prior to the time that the faucet casting D is applied to the shank. The flow regulator is of the same form and construction as heretofore described except that the wedge B at its wider end is provided with a transverse flange 58, which is cut away adjacent the groove 36 of the wedge B and which otherwise engages peripherally against the interior of the chamber 59 of the faucet casting. The purpose of this flange is to commingle the beer streams issuing from the flow regulator at the time of entry into the chamber 59, so that the beer will issue from the spigot 47 without agitation and in a steady stream without excessive foam formation.

In this form of the invention, the extension 26 of the spindle 20 is connected by means of a pin 60 to a cap nut 61 for rotating the spindle to adjust the wedge. In this form of the invention, the cap nut is prevented from separation from the faucet casting by means of a pin 62 passing through a portion of the nut and engaging a groove in the casting, as may be observed in Figure 6.

The manner of operation of this form of the invention is similar to that described with respect to the form illustrated in Figures 1 to 5 inclusive.

As may be readily observed, the present invention relates to provision of means for regulating the flow of beer, in beer dispensing means, wherein a bored member is equipped with a core, the core comprising two relatively movable parts adjustable to provide passageway through the core whereby the cross-sectional area or volumetric capacity of the passageway may be varied to accommodate the structure for use with bar equipment in which the pressures in the beer barrels or kegs vary from low pressure of say ten pounds to sometimes as high as fifty and sixty pounds according to the practice of different bartenders.

Under conditions of extreme pressure and carbonization, the wedge is spaced but a very slight distance from the walls of the slot so that the cross-sectional area of the passageway is at a minimum. Because of the provision of the transverse hole at the opening and grooves present in the wedge member, skin friction is reduced to a point where the beer issues from the flow regulator in a steady stream at low pressure and without the formation of excessive foam.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

The invention is claimed as follows:

1. Means for controlling the flow of beer from a barrel to a faucet including a member having a bore through it, a core within said bore in surface engagement therewith and held therein against axial and rotative movement and having an elongated V-shaped slot in it extending from one end toward and stopping short of the other end, a complemental wedge member axially movable in said slot and having surfaces for making surface contact with the slot surfaces, means for axially adjusting said wedge to provide restricted passageway through said core between the surfaces of said slot and said wedge, said core having its other end hollow to admit fluid to said passageway, said wedge having a transverse opening through it between its ends and having an outlet from said opening to the exterior of said wedge, the exterior of said wedge being grooved lengthwise of the same from said outlet to the larger end thereof, and said groove cooperating with the member walls to define a flow path for fluid along the exterior of said wedge.

2. Means for controlling the flow of liquid through a member having a bore in it, comprising a core insertible in said bore in surface engagement therewith and held therein against axial and rotative movement and having an elongated V-shaped slot in it extending from one end toward and stopping short of the other end with the apex of the slot adjacent said other end, the end of said core beyond said apex being bored for entrance of liquid to said slot, a complemental wedge member axially movable in said slot and having surfaces for making surface contact with the slot surfaces, and a screw threaded into the wider end of said wedge member for shifting it in said slot and for centering the wedge with respect to the slot walls.

3. Means for controlling the flow of liquid through a member having a bore through it, said means comprising an outer member exteriorly contoured to tightly fit said bore and having an entrance bore at one end and a V-shaped slot extending from said bore to the other end with the apex of the slot in communication with said bored end and with the width of said apex less than the diameter of said bored end, a complementally shaped wedge member axially adjustable in said slot to cooperate with the walls thereof to define a restricted passageway from the bored end of said outer member to the other end of the same, means for shifting said wedge member, and said outer member and wedge member having cooperating means for limiting endwise movement of said wedge member with respect to said slot.

FRANK E. RICE.